C. W. ANDERSON.
POWER CONTROL FOR DRIVE MECHANISM.
APPLICATION FILED MAY 28, 1919.
1,422,809.
Patented July 18, 1922.
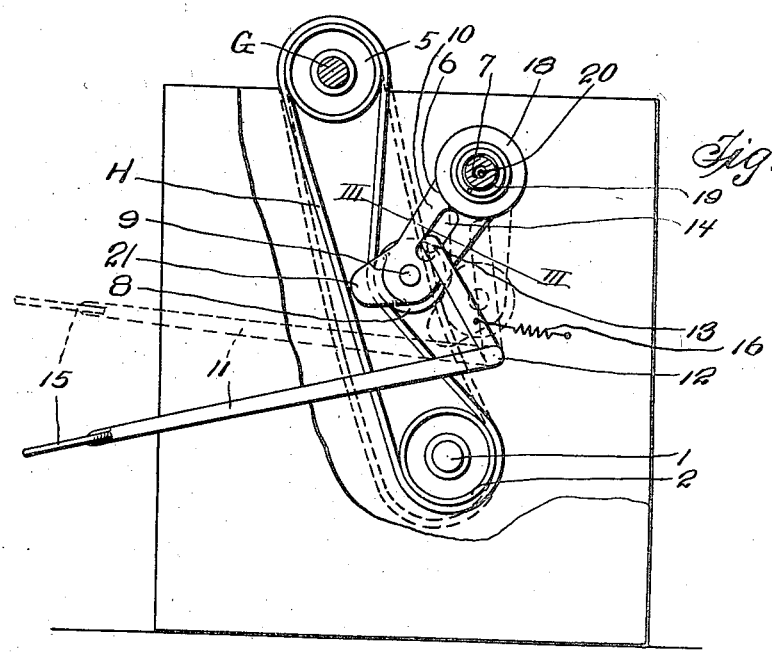
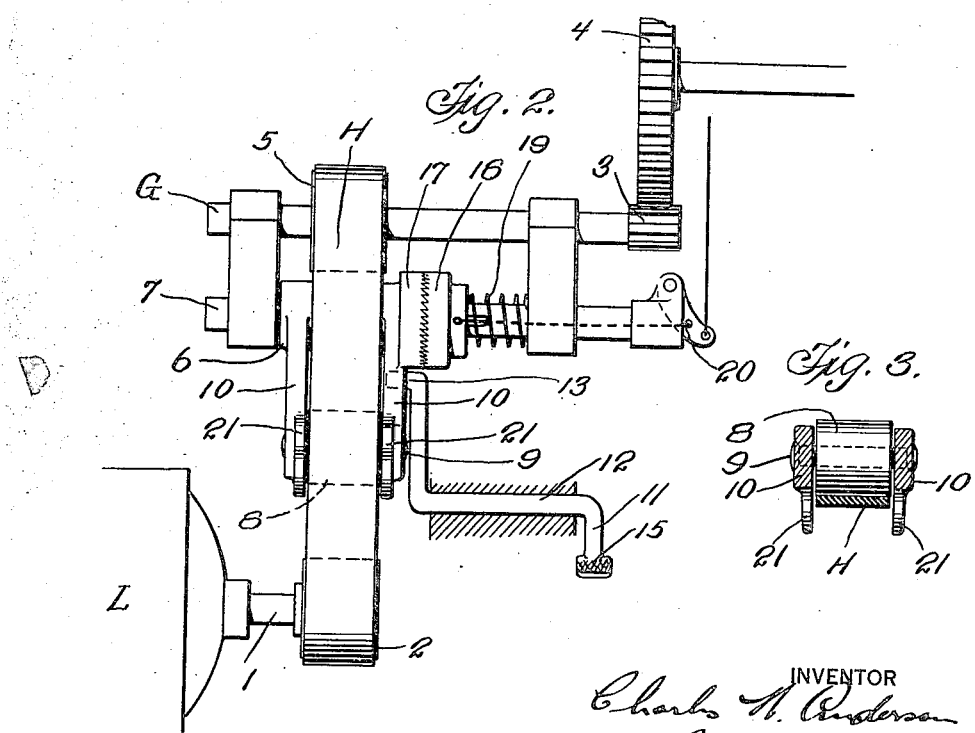
INVENTOR
Charles W. Anderson
BY
ATTORNEY

UNITED STATES PATENT OFFICE.

CHARLES W. ANDERSON, OF BROOKLYN, NEW YORK.

POWER CONTROL FOR DRIVE MECHANISM.

1,422,809.  Specification of Letters Patent.  Patented July 18, 1922.

Application filed May 28, 1919. Serial No. 300,305.

*To all whom it may concern:*

Be it known that I, CHARLES W. ANDERSON, residing at Brooklyn, in the county of Kings and State of New York, have invented certain new and useful Improvements in Power Controls for Drive Mechanism, of which the following is a specification.

This invention relates to power control for drive mechanism such as is shown in my copending application Serial No. 161,344, in which mechanism a slack belt is employed in connection with a belt-tightener.

A particular object of the present invention is to provide a simple, inexpensive, and effective means for maintaining the belt in proper cooperative relation with its pulleys and with the belt-tightener.

A further object is to provide means whereby the belt-tightener is made to serve the additional purpose of at all times retaining the belt against displacement.

A more detailed object is to provide a belt-tightener made up of a pivotally mounted member having a pair of projecting arms between which is mounted a roller adapted to swing with the member into and out of tightening engagement with the belt, and to provide extensions from said arms at opposite sides of the roller so arranged as not only to maintain the roller and belt in cooperative relation, but also to maintain guiding relation with the belt such as to retain the belt against displacement from its drive and driven pulleys without the necessity for requiring guide flanges on either of said pulleys.

Other objects and aims of the invention, more or less specific than those referred to above, will be in part obvious and in part pointed out in the course of the following description of the elements, combinations, arrangements of parts, and applications of principles, constituting the invention, and the scope of protection contemplated will be indicated in the appended claim.

In the accompanying drawings which are to be taken as a part of this specification, and in which I have shown merely a preferred form of embodiment of the invention:—

Fig. 1 is a side elevational view, partly in section, of a device constructed in accordance with this invention.

Fig. 2 is a front elevational view, also partly in section, of the structure shown in Fig. 1, and Fig. 3 is a transverse sectional view taken substantially upon the plane of line III of Fig. 1.

Referring to the drawings for describing in detail the structure which is illustrated therein, the reference character L indicates a motor having a drive shaft 1 and a drive pulley 2.

The reference character G indicates a shaft carrying a pinion 3 for engaging the drive gear 4 of a hod elevator or the like, said shaft G also carrying a pulley 5 to be driven by the pulley 2.

A slack belt H extends between the pulleys 2 and 5.

The belt-tightener includes a body member 6 which is mounted to oscillate upon a fixed shaft 7 arranged substantially parallel to the shafts 1 and G, and adapted to hang below said shaft 7. At its lower end the body member 6 is provided with a belt-tightening roller 8 which is mounted upon a pin 9, extending between spaced arms 10 of said member 6.

Normally the roller 8 hangs free of the belt H.

Any suitable means may be employed for swinging the roller into engagement with the belt when desired. Two examples of such means are illustrated in my copending applications Serial No. 161,344, and Serial No. A-106, the former illustrating a hand control, and the latter illustrating a foot lever control similar to that shown herein.

As herein illustrated, the foot lever 11 is pivotally mounted, at 12, and has a pin 13 engaging within a slot 14 formed in one of the arms 10. Downward pressure upon the outer end 15 of the lever will swing the roller 8 forcefully against the belt. A spring, or other suitable means, as 16, may be arranged to normally retain the roller from pressing against the belt.

Due to the slackness of the belt, no motion is transmitted from the pulley 2 to the pulley 5 except when the roller 8 is pressing against the belt.

As a suitable means for retaining the roller in tightening position a clutch member 17—18 is herein illustrated, the same being similar to that shown and described in my copending application Serial No. A-105, by reference to which it will be seen that the clutch member 18 has a sliding engagement with the shaft 7, which engagement also retains it against unlimited rotation. A spring 19 is provided for urging the member 18 normally into engagement with the member 17, and the teeth of said member 17—18 are so arranged as to permit free movement of the body member into tightening position but to restrain movement thereof into non-tightening position. An operating link 20 is connected with the clutch member 18 for releasing the clutch whenever desired.

The roller 8 is preferably of equal, or slightly greater width than the width of the belt, and each of the arms 10 is provided with an extension or finger 21 arranged parallel to each other and projecting laterally from the arms so as to over-lap the edges of the belt. They are close to the roller and thus positively prevent edgewise movement of the belt off the roller 8.

The fingers are of such length as to maintain their restraining relation with the belt irrespective of whether the roller be in tightening position or not.

Since the pulleys 2 and 5, of course, stand in alignment with the roller 8, it is apparent that the fingers 21, by maintaining the belt aligned with the roller, also maintain it aligned with the pulleys. No other guiding means is required for the belt. Marginal flanges upon the pulleys, which are expensive to produce, may be entirely dispensed with, and said pulleys and roller may all be simply plain, smooth, and cheaply machined members.

The omission of expensive flange pulleys affords a material saving in cost of manufacture, while the guide fingers, which displace said flanges, may be provided at practically no additional cost. The fingers are simply cast as integral parts of the body member 6, and no machining of any description is required upon them.

Furthermore, it may be added here that for hod elevators, in connection with which this invention is particularly adapted for use, flanged pulleys have been found to be unsatisfactory especially where the belt is new and stiff. The distance between the pulleys is so short, and the belt so stiff and unwieldly, that the necessary inaccuracies in the texture of the belt, or its lacing, invariably causes the belt to ride over one or the other of the flanges. The provision of the fingers 21 engaging the belt at a point intermediate the pulleys, has been found to entirely obviate the difficulty and to be equally effective whether the belt be new or old.

As many changes could be made in this construction without departing from the scope of the invention as defined in the following claim, it is intended that all matter contained in the above description or shown in the accompanying drawings, shall be interpreted as illustrative only and not in a limiting sense.

Having thus described my invention, what I claim as new and desire to secure by Letters Patent is:—

In combination, two smooth-faced pulleys spaced apart, a belt extending between said pulleys adapted to drive one of said pulleys from the other, said belt being normally loose and being arranged so that one lead thereof extends in an approximately vertical direction between said pulleys, a tightener for said belt comprising a body part having two arms projecting therefrom, means whereby said body is pivotally supported so that said arms hang by gravity below said body, an anti-friction roller pivotally supported between said arms at the lower ends thereof adapted to swing with said arms into and out of tightening position against said mentioned lead of the belt, an operating member engaging one of said arms operable to swing said arms into and out of belt tightening position, a spring for maintaining said operating member and said arms normally in non-tightening position, and projections formed upon said arms extending at an angle therefrom into positions for overlapping opposite edge portions of the belt, the arrangement being such that said projections will overlap the edges of the belt and thus serve to guide the belt with respect to said two pulleys at all times whether said arms be in belt tightening or non-tightening position.

In testimony whereof I affix my signature in the presence of two witnesses.

CHAS. W. ANDERSON.

Witnesses:
L. GESSFORD HANDY,
E. W. HAVILAND.